United States Patent [19]

Baxi et al.

[11] Patent Number: 5,151,278
[45] Date of Patent: Sep. 29, 1992

[54] PLASTIC INJECTION MOLDING NOZZLE WITH GAS ASSIST

[75] Inventors: Indra R. Baxi, Solon; Tom W. Johnson, Hunting Valley, both of Ohio

[73] Assignee: Nitrojection Corporation, Middlefield, Ohio

[21] Appl. No.: 682,616

[22] Filed: Apr. 9, 1991

[51] Int. Cl.[5] .......................................... B29C 45/23
[52] U.S. Cl. ............................. 425/130; 264/328.8; 264/328.13; 264/572; 425/564; 425/573
[58] Field of Search ............... 264/572, 328.8, 328.13; 425/130, 132, 133.1, 562, 564, 573

[56] References Cited

U.S. PATENT DOCUMENTS

| | | | |
|---|---|---|---|
| 2,940,123 | 6/1960 | Beck et al. | 425/170 |
| 4,033,710 | 7/1977 | Hanning | 425/4 R |
| 4,082,226 | 4/1978 | Appleman et al. | 425/564 |
| 4,106,887 | 8/1978 | Yasuike et al. | 425/549 |
| 4,140,672 | 2/1979 | Kataoka | 425/817 R |
| 4,555,225 | 11/1985 | Hendry | 425/4 R |
| 4,657,496 | 4/1987 | Ozeki et al. | 425/130 |
| 4,781,554 | 11/1988 | Hendry | 425/564 |
| 4,905,901 | 3/1990 | Johnson | 264/328.7 |
| 5,030,076 | 7/1991 | Ebenhofer et al. | 264/572 |

OTHER PUBLICATIONS

The Best of Two Worlds in Plastic Processing, *Machine Design Magazine*, Dec. 9, 1982, by Donald R. Dreger, Staff Editor.

*Primary Examiner*—Tim Heitbrink
*Attorney, Agent, or Firm*—Fay, Sharpe, Beall, Fagan, Minnich & McKee

[57] ABSTRACT

An apparatus for injecting a viscous fluid such as a thermoplastic and a non-viscous fluid such as a gas into a mold cavity of a mold body includes a nozzle body having an inlet end, a discharge end and a flow passage for the viscous fluid extending from the inlet end to the discharge end. A valve element is mounted for reciprocation in the nozzle body flow passage to control the flow of the viscous fluid through the nozzle body discharge end. The valve element includes a barrel having a first end selectively engaging a portion of the nozzle body discharge end to prevent a flow of viscous fluid therepast and a second end. A bore extends longitudinally through the barrel. A pin is located in the barrel bore. The pin has a first end located adjacent to the barrel first end and a second end secured to the nozzle body such that the pin remains stationary as the barrel reciprocates in the nozzle body. A non-viscous fluid flow passage is defined between the pin and the barrel.

19 Claims, 3 Drawing Sheets

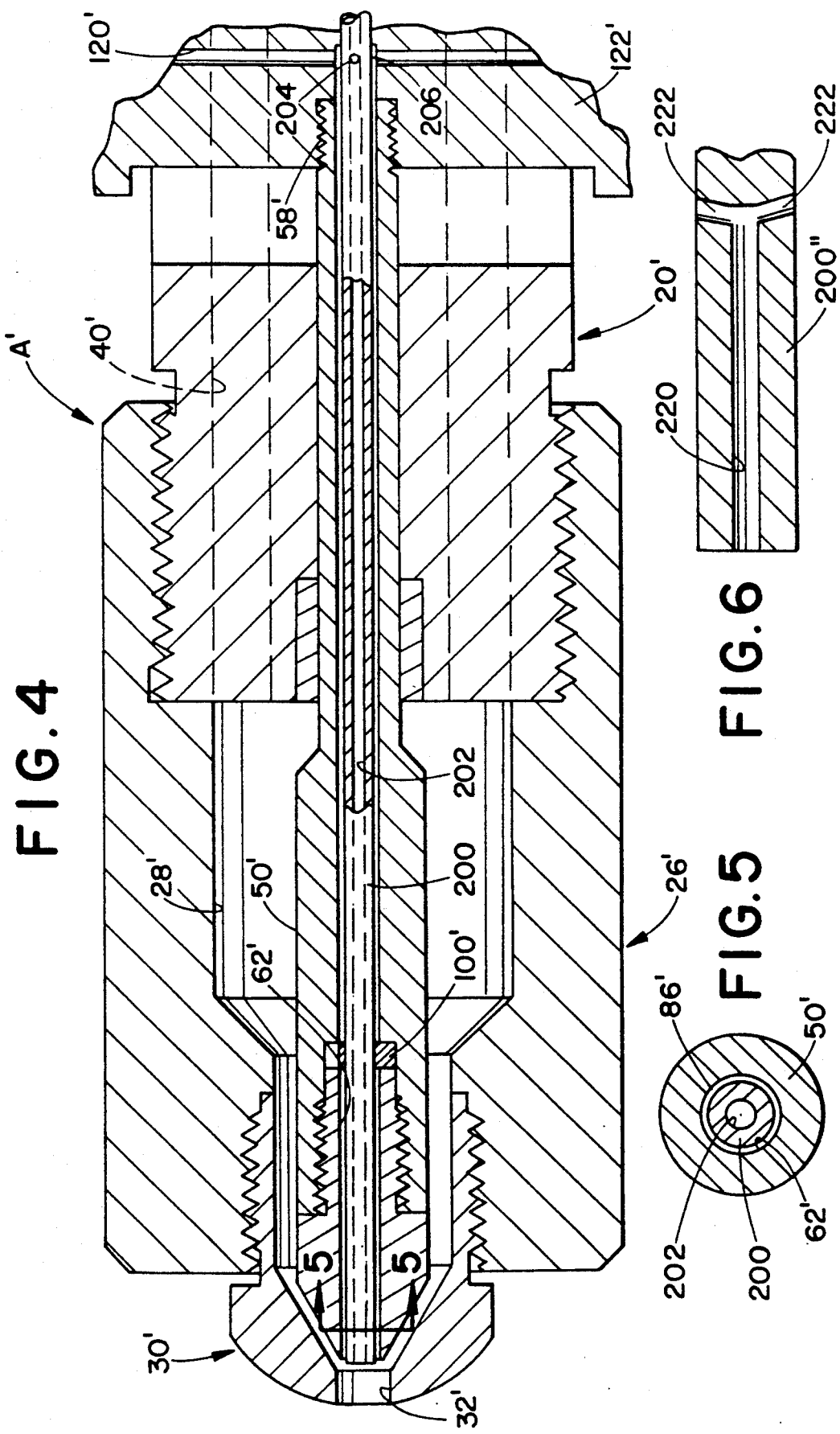

PLASTIC INJECTION MOLDING NOZZLE WITH GAS ASSIST

BACKGROUND OF THE INVENTION

This invention generally pertains to an injection molding apparatus. More specifically, the present invention relates to a plastic injection molding nozzle which has a fluid assist mechanism.

The invention is particularly applicable to a gas assisted injection molding process in which a nozzle is utilized to inject a viscous fluid, such as a molten plastic, into a mold cavity together with a non-viscous fluid, such as a gas. However, it will be appreciated by those skilled in the art that the invention has broader applications and may also be adapted for use in many other injection molding environments where both a relatively viscous fluid, such as a plastic or wax, and a relatively non-viscous fluid, such as a gas or liquid, are injected into a mold cavity.

Recently, gas assisted injection molding has gained popularity. In this process, the mold cavity is filled with a plastisized thermoplastic material to a volume less than 100% of the mold space and an inert gas is injected under pressure into the plastisized material to fill the rest of the volume in the mold cavity. The gas is injected into the center of the flow of plastic but does not mix with the melt and instead runs along specially designed channels. In this way, with a suitably designed part, a continuous network of hollowed out sections can be provided. The material displaced by the gas from the middle of the sections moves out to fill the remainder of the mold space.

This network of gas channels provides a uniform pressure distribution system throughout the mold space during part rehardening and cool down thus minimizing internal stresses. Gas injection provides a solution to a number of problems that have long plagued the injection molding industry. These include reducing stress and warpage of the plastic part, elimination of sink marks and the provision of smooth surfaces on the injection molded part. In addition, clamp tonnage requirements can be reduced in comparison to conventional injection molding processes. The process also permits different wall thicknesses and faster cycles in comparison with the conventional injection molding processes. Also, gas assisted injection molding reduces the need for external flow runners.

Several types of nozzles are known for gas assisted injection molding. However, many of these nozzles do not vent the gas back through the nozzle when the discharge of the gas is required. Even those nozzles which do vent the gas back through the nozzle are unsatisfactory because the molten plastic remaining in the nozzle or in the sprue and runner system is frequently vented back along with the gas thus causing one of the major difficulties with gas assisted injection molding, namely, that the gas channels in the nozzle become plugged with thermoplastic which solidifies and blocks off further gas flow through these channels. In addition, the gas piping and valves downstream from the nozzle can become plugged. The nozzle then becomes unuseable until it is cleaned out which is a time consuming, difficult and expensive process.

Accordingly, it has been considered desirable to develop a new and improved injection molding nozzle which would overcome the foregoing difficulties and others while providing better and more advantageous overall results.

BRIEF SUMMARY OF THE INVENTION

In accordance with the present invention a new and improved apparatus for injecting a viscous fluid such as a thermoplastic and a non-viscous fluid such as a gas into a mold cavity of a mold body is provided.

More particularly in accordance with the invention, the apparatus comprises a nozzle body comprising an inlet end and a discharge end and a flow passage for viscous fluid extending from the inlet end to the discharge end. A valve element is mounted for reciprocation in the nozzle body flow passage to control a flow of the viscous fluid through the nozzle body discharge end. The valve element comprises a barrel having a first end selectively engaging a portion of the nozzle body discharge end to prevent a flow of the viscous fluid therepast and a second end. A bore extends longitudinally through the barrel. A pin is located in the barrel bore. The pin has a first end located adjacent the barrel first end and a second end secured to the nozzle body such that the pin remains stationary as the barrel reciprocates in the nozzle body. A non-viscous fluid flow passage is defined between the pin and the barrel.

In accordance with another aspect of the invention, the pin can be solid such that a flow path extends only through the non-viscous fluid flow passage which is defined between the pin and the barrel.

According to still another aspect of the invention, the pin includes a longitudinally extending bore through which fluid can also flow thereby providing two flow paths for the fluid, one through the non-viscous fluid flow passage defined between the pin and the barrel and the other path being through the pin's bore.

According to still another aspect of the invention, fluid is communicated to the non-viscous fluid flow passage defined between the pin and the barrel by fluid flow apertures which extend through a crosslink member which is part of a system utilized to reciprocate the barrel in the nozzle body.

One advantage of the present invention is the provision of a new and improved gas assisted injection molding nozzle.

Another advantage of the present invention is the provision of a nozzle which allows the flow of a viscous fluid, such as a molten plastic, into a mold cavity and the flow of a non-viscous fluid, such as a gas, into the mold cavity and allows a venting of the non-viscous fluid out of the mold cavity.

Still another advantage of the present invention is the provision of a gas assisted injection molding nozzle which is not as prone to plugging as are the known nozzles.

Yet another advantage of the present invention is the provision of a gas assisted injection molding nozzle which includes a reciprocating barrel or spreader and a non-moving pin which is positioned in a longitudinally extending bore in the barrel such that a gas passage is defined between the pin and the barrel.

A further advantage of the present invention is the provision of a gas assisted injection molding nozzle which is self cleaning so as to prevent a deposition of plastic in the gas flow passage of the nozzle thereby preventing a plugging of the nozzle.

A still further advantage of the present invention is the provision of a gas assisted injection molding nozzle which has two gas flow paths, one being defined in an aperture extending through a pin and another one being defined between the pin and a barrel.

Still other benefits and advantages of the invention will become apparent to those skilled in the art upon a reading and understanding of the following detailed specification.

BRIEF DESCRIPTION OF THE DRAWINGS

The invention may take form in a certain structure preferred and alternate embodiments of which will be described in detail in this specification and illustrated in the accompanying drawings. In the drawings:

FIG. 4 is a side elevational view in cross section of a gas assisted injection molding apparatus according to an alternate embodiment of the present invention; and, FIG. 5 is an enlarged cross sectional view of a barrel and pin of FIG. 4 along line 5—5; and, FIG. 6 is a cross-sectional view of a pin according to another alternate embodiment of the present invention.

DETAILED DESCRIPTION OF THE PREFERRED AND ALTERNATE EMBODIMENTS

Figure 1:
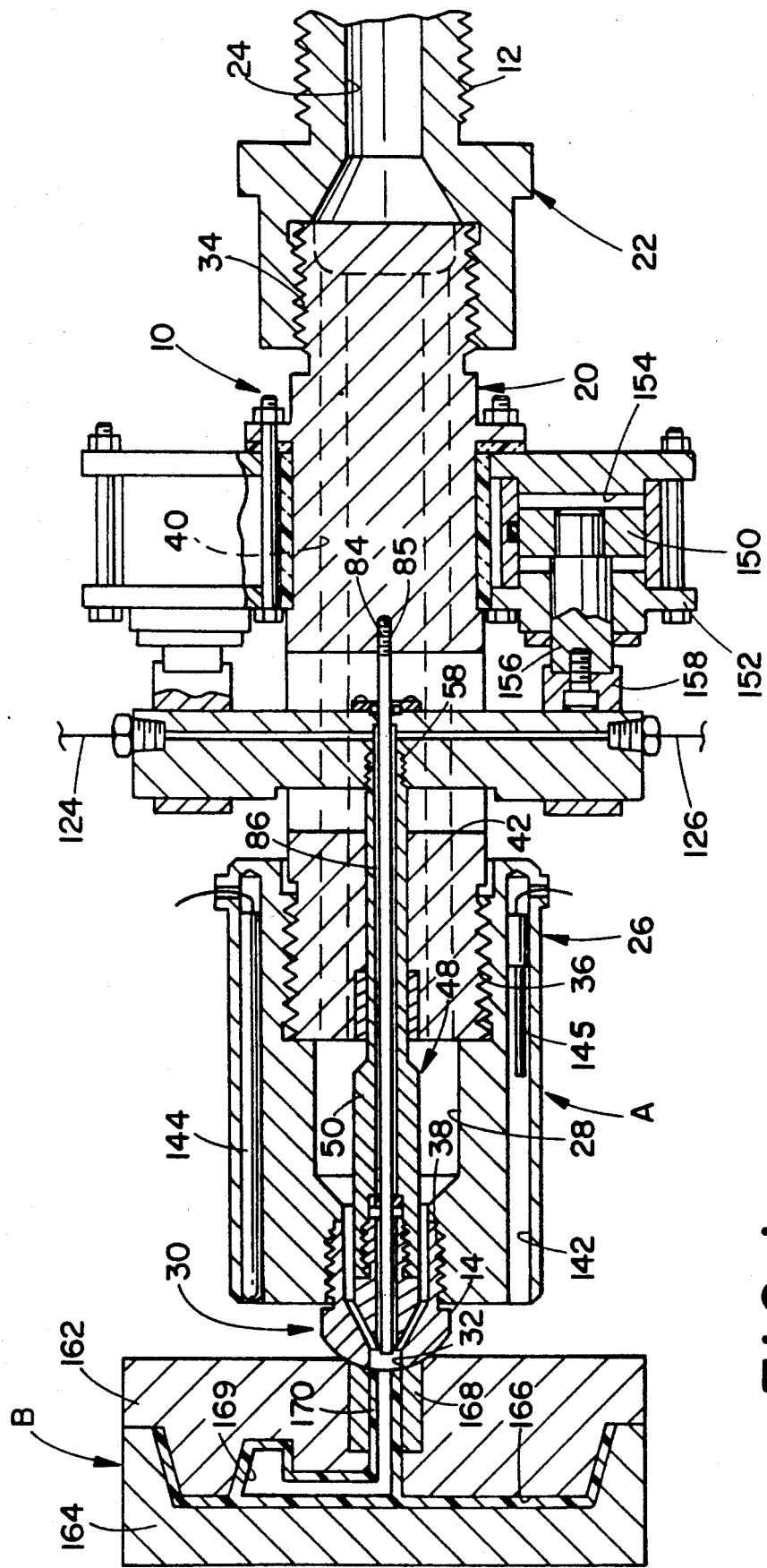
FIG. 1 is a side elevational view in cross-section of a gas assisted injection molding apparatus and a mold according to the preferred embodiment of the present invention.

Referring now to the drawings, wherein the showings are for purposes of illustrating preferred and alternate embodiments of the invention only and not for purposes of limiting same, FIG. 1 shows a fluid assisted injection molding apparatus which includes the subject new nozzle A located adjacent a mold body B. While the nozzle is primarily designed for and will hereinafter be described in connection with an apparatus used for the gas assisted injection molding of molten thermoplastics, it should be appreciated that the nozzle could also be used in various other molding environments in which a relatively viscous fluid and a relatively non-viscous fluid are injected, such as for the production of lost wax masters and the like.

The nozzle comprises a nozzle body 10 having an inlet end 12 and a discharge end 14. The nozzle includes a housing having a central section 20 and an adaptor or rear section 22 having a longitudinal bore 24 extending therethrough. Also provided is a barrel housing 26 having a longitudinal bore 28 extending therethrough and a tip 30 which similarly has a longitudinal bore 32 extending therethrough. The adaptor 22 is suitably secured to the central section 20 by interengaging threads as at 34. Similarly, interengaging threads as at 36 secure the barrel housing 26 to the central section 20. Securing the tip 30 to the barrel housing 26 are suitable threads as at 38.

Figure 2:
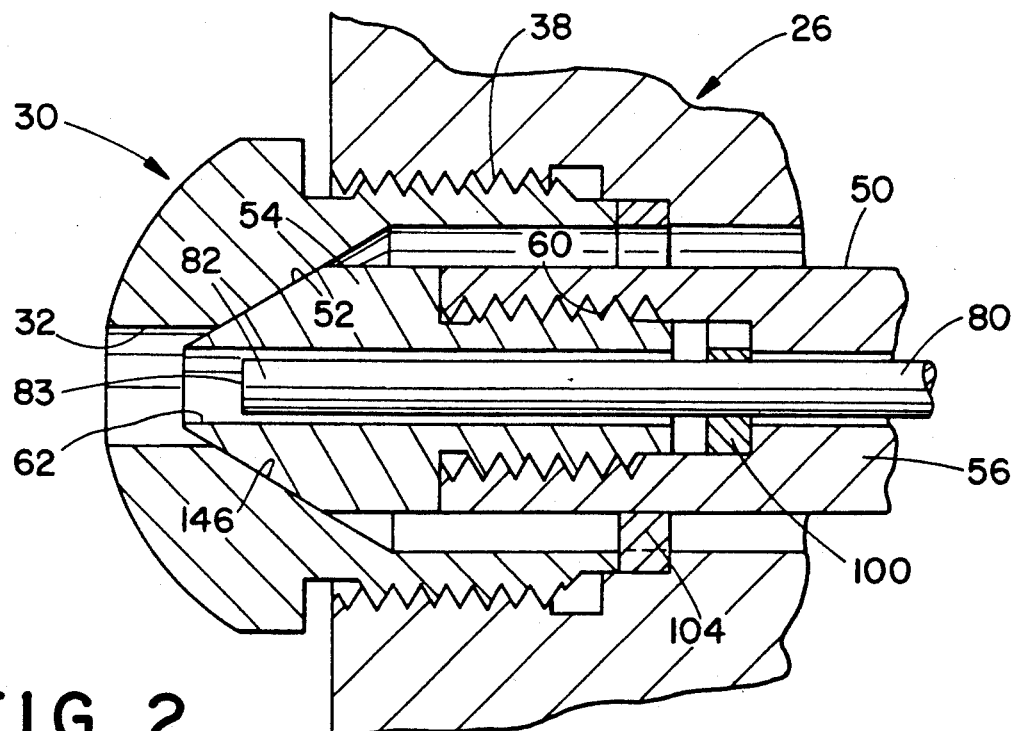
FIG. 2 is a greatly enlarged cross sectional view of a portion of the apparatus of FIG. 1 with a reciprocating barrel being in a closed position.
Figure 3:
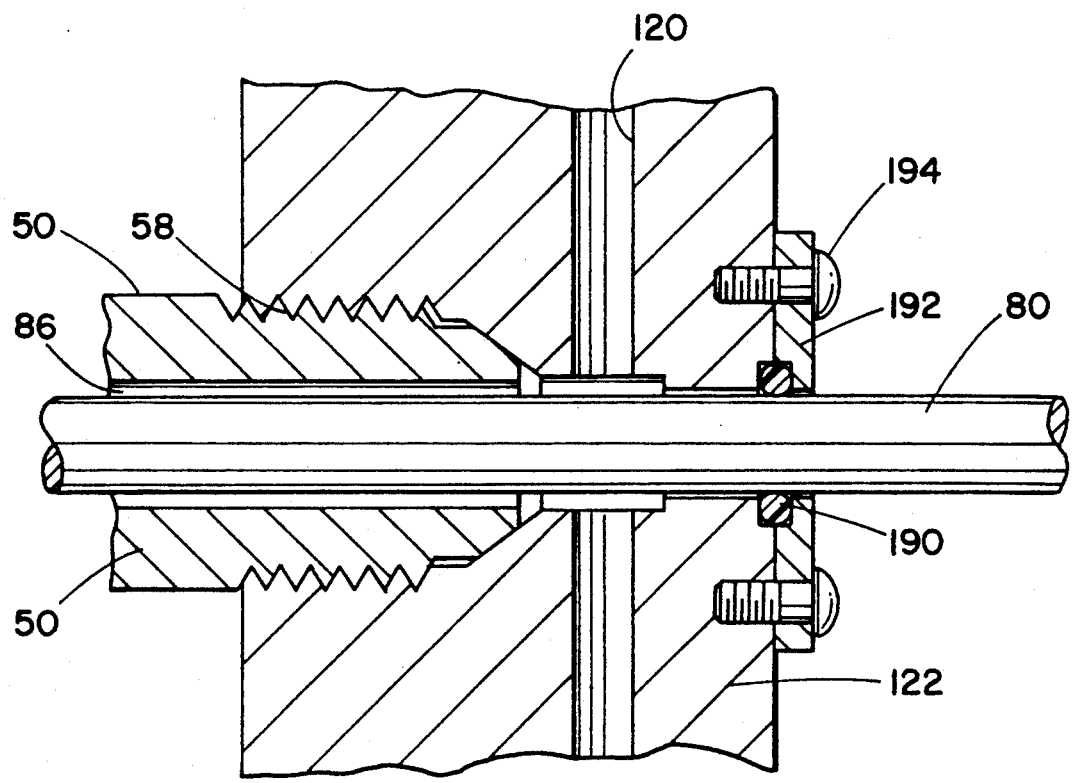
FIG. 3 is a greatly enlarged cross sectional view of another portion of the apparatus of FIG. 1.

The central section 20 has a first aperture 40 extending longitudinally therethrough in an orientation which is coaxial with the bores 24, 28 and 32 of the adaptor, barrel housing and tip respectively. Preferably two kidney shaped apertures 40 are provided in the central section 20, as is known. This allows for the formation of the flow channel entirely through the nozzle A. A second aperture 42 extends through opposing sidewalls of the central section 20 in a direction normal to the first aperture 40 and not in communication therewith. A valve body 48 is adapted to reciprocate in the nozzle body 10. For this purpose, a spreader or barrel 50 of the valve body is reciprocatingly mounted in the bore 28 of the barrel housing 26. With reference now also to FIG. 2, the barrel 50 has a tapered first end 52 located on a front section 54 thereof, as well as a rear section 56 having a threaded end portion as at 58 (FIG. 3). A threaded area 60 may be utilized to secure the front and rear barrel sections 54 and 56 to each other.

Extending longitudinally through the front and rear sections 54 and 56 is a bore 62. A longitudinally extending path is thus defined through the barrel 50 by the bore 62.

Extending through the bore 62 is a suitably shaped pin 80 which has an external diameter of suitable size so that it does not interfere with a reciprocating motion of the barrel 50. That motion is shown by a comparison of FIGS. 1 and 2. The pin 80 has a front end 82 which is located adjacent the barrel front end 52. The front end 82 has a flat front face 83. With reference again to FIG. 1, the pin 80 also has a suitably threaded rear end as at 84 so that the pin can be threaded into a suitable aperture 85 provided in the nozzle body central section 20. With this design, the barrel will reciprocate whereas the pin 80 will be stationary. Of course it should be appreciated that other ways of securing the pin 80 in place so that it remains stationary as the barrel 50 reciprocates are also possible.

Gas flow between the pin and the barrel will take place through a gas flow passage 86 defined between them, as seen in FIGS. 2 and 3. That gas flow passage can be best seen in the cross-sectional view of FIG. 5. It is noted that the diameter of the pin 80 is sufficiently smaller than the diameter of the bore section 62 so as to always allow for a flow of gas therebetween, even when the barrel is retracted so as to allow molten thermoplastic to flow into the mold body B. Preferably the pin 80 is in the shape of a right cylinder which has a substantially constant diameter, although other shapes are also possible.

With reference again to FIG. 2, located in the bore 62 is a spider 100 which supports the pin 80 to prevent it from moving in a direction transverse to the reciprocating motion of the barrel 50. A suitable spider 104, located in the bore 28 can support the barrel front end, if desired. Again this would be for the purpose of preventing the barrel front end from moving in a direction transverse to its reciprocating motion.

With reference now to FIG. 3, the gas passage 86 defined between the barrel 50 and the pin 80 communicates with an aperture 120 which extends longitudinally in a cross bar or cross link member 122 which is secured to the barrel 50 by the suitable threading 58. As shown in FIG. 1, the aperture 120 communicates at each end of the cross bar 122 with a respective suitable fluid line 124 and 126.

The barrel housing 26 preferably further includes a plurality of longitudinally extending bores 142. Accommodated in one of these bores is a suitable conventional cartridge heater 144 for heating the barrel housing 26, which is preferably made from a suitable conventional metal. Preferably accommodated in another one of the bores 142 is a suitable conventional thermocouple 145 which measures the temperature of the barrel housing 26. The thermocouple is preferably a part of a means to regulate the heat output of the heater bar or cartridge heater through a suitable conventional circuit (not illustrated). This structure is meant to suitably heat the barrel housing in order to insure that the molten thermoplastic flowing through the bore 28 is maintained at an adequate temperature. Similarly, suitable heating means such as the cartridge heaters 144 or conventional heater bands or the like (not illustrated) can be provided for the central section 20 of the nozzle body 10.

While a separate heater cartridge 144 and thermocouple 145 are illustrated in FIG. 1, it is anticipated that one could combine the functions of these two elements in a single cartridge/thermocouple system which could then be self regulating. Such a system would be especially advantageous in the case of small diameter barrel housings where not much room is available for a separate bore accommodating a thermocouple.

The nozzle preferably further comprises a means for selectively urging the valve body 48 in a first direction so as to close the nozzle body discharge end 14 by abutting the first end 52 of the barrel 50 against an angled portion 146 of the tip 30, (see FIG. 2) and in a second direction to open the discharge end. The means for selectively urging is secured to the nozzle body central section 20 and preferably comprises a toroidally shaped piston 150 that is held in a housing 152 which defines a chamber or a cavity 154 in which the piston reciprocates as controlled by a pressurized fluid delivered selectively to one of the faces of the piston. Secured to a front surface of the piston are a pair of piston rods 156 which are connected at their free ends to a pair of holders 158. The holders, in turn, are so shaped as to hold the cross bar 122 and thus enable the valve body 48, including the barrel 50, to be reciprocated.

The tip 30 adjoins the mold body B which includes a first mold half 162 and a second mold half 164. The mold halves define between them a mold cavity 166. Preferably, a sprue body 168 is located in the mold first half 162 and enables the tip 30 to communicate with the mold cavity 166.

In use, an amount of molten thermoplastic sufficient for the preparation of the injection molded product, and normally less than the volume of the mold cavity 166, is injected through bores 24, 40, 28 and 32, through the sprue body 168 and into the mold cavity 166. Either simultaneously therewith, or thereafter, a quantity of a suitable non-viscous fluid, such as a gas, is introduced through line 124, aperture 120 and the gas flow passage 86 defined between the pin 80 and the barrel 50 through the tip bore 32 and into the mold cavity 166. The gas forms a fluid cavity 169 in the molten thermoplastic material 170 held in the mold cavity 166 and pushes the molten thermoplastic material out against the walls of the mold cavity. The thermoplastic material is thereupon allowed to cool until it is capable of retaining the shape imposed on it by the mold cavity. Subsequently, the fluid, preferably a gas, is vented from the fluid cavity 169 created in the thermoplastic material and back through the passage 86.

As mentioned one of the major problems with gas assisted injection molding is that during venting still molten plastic, in the form of plastic strings, is sucked back into the gas flow passages blocking such passages and preventing any further gas flow through them. One advantage of the construction illustrated in FIGS. 1–3 is that the peripheral gas flow path 86 around the pin 80 will limit the entry during venting of any thermoplastic strings or particles. If any thermoplastic remains molten at the start of the venting process, that thermoplastic is located at the gas-plastic interface at the wall of the gas cavity 169. Thus the molten plastic is centrally located and will flow (in the form of a molten plastic string) straight down the sprue until it reaches the pin 80. It is believed that the strings will simply impact the flat front face 83 of the pin 80 which front face is cooler than the string temperature so as to begin cooling the string. A turbulent gas flow, which it is believed is caused by the cooperation of the barrel and pin so as to provide a toroidal flow path 86 (and no central flow path) around the periphery of the pin will throw the strings outwardly, outside the path 86 and into bore 32. As presently understood, the strings will then cool down into particles which are too large to fit through the gas flow path and into a plastic film coating which adheres to the outer periphery of bore 32.

As mentioned the amount of thermoplastic which is sucked back during venting is also limited by the structure of the nozzle A. More particularly, the barrel is self cleaning in that plastic deposition either on the walls of the bore 62 or on the sides of the pin 80 adjacent the front end 82 thereof are wiped off by the reciprocation of the barrel 50 in relation to the pin 80. It is noted in this regard that the bore 62 closely encircles the pin front end 82. Preferably, the pin has a diameter of 0.125 inches (0.318 cm.) whereas the barrel bore 62 has an inner diameter of 0.1406 inches (0.357 cm.). Accordingly, the gap between these two is 0.0156 inches (0.00396 cm). While this gap is minuscule, a suitable volume of gas is able to flow through this space due to the cylindrical or toroidal nature of the space. Perhaps this can be best seen in FIG. 5 of the drawings. Due to the toroidal shape of the flow path, there is enough area provided by the flow path to enable the gas to flow in and out of the mold cavity 166. The area is $\Pi \times 0.0703^2 - \Pi \times 0.0625^2 = 0.0155257 - 0.0122716 = 0.0032541$ square inches (0.020994 cm.$^2$).

It is believed that the tip of the pin 80, i.e. the flat front face 83 thereof, should be located ahead of the tip of the barrel 50 by a small amount e.g. 2–3 mm. (0.078–0.118 in.) when the barrel is retracted as is shown e.g. in FIGS. 1 and 4. It is believed that with this type of construction, the molten thermoplastic which flows past the pin will heat the tip of the pin and through conduction the rest of the pin. The pin will, in turn, maintain the heat of the gas flowing therepast. Since the pin is somewhat heated, it doesn't cool the thermoplastic flowing therepast which would cause a cold slug at that point. In addition, it is believed that locating the pin tip ahead of the tip of the barrel will eliminate any tendency for plastic to hang up in the gap which would be formed between the pin tip and the barrel tip if the pin tip were located behind the barrel tip when the barrel is retracted. At this time the stroke of the barrel is approximately 0.125 inches (0.318 cm.). It should be appreciated that other stroke lengths are also possible and may be necessary under certain conditions.

With reference now to FIG. 3, in order to prevent the gas from flowing out of the passage 86 towards the threaded end 84 of the pin 80, a suitable seal member 190 encircles the pin 80. Preferably, the seal member can be a high temperature O-ring made of a suitable elastomeric material. The seal is held in place by a backing plate or washer 192. The plate, in turn, is fastened to the cross bar or cross link member 122 by suitable fasteners 194 such as machine screws.

With reference now to FIG. 4, an alternate embodiment of an injection molding nozzle is there illustrated. For ease of comprehension and appreciation of this alternative, like components will be identified by like numerals with a primed suffix (') and new components will be identified by new numerals.

An injection nozzle A' includes a central section 20', a barrel housing 26' and a tip 30'. Extending longitudinally through the central section 20', barrel housing 28' and tip 30' are respective apertures or bores 40', 28' and 32' to create a flow path for the molten thermoplastic to flow into a mold body. Mounted for reciprocation in the nozzle A' is a suitable barrel 50'. Extending longitudinally through the barrel is a bore 62'. Extending through the bore 62' is a pin 200 which is of a suitable diameter so as to allow a reciprocating motion of the barrel in relation to the pin.

In contrast to the pin 80 disclosed in FIGS. 1–3, the pin 200 of FIGS. 4 and 5 is hollow such that it has a longitudinally extending bore 202 therein. The bore 202 extends in the pin to at least an aperture 120' which extends through a cross bar member 122' to which the barrel 50' is threadedly secured as at 58'. In order to communicate the aperture 120' with the aperture 202, at least one port 204 is provided on the pin 80 in line with the aperture 120'. Also, if desired, an overcut 206 can be provided in the vicinity of the aperture 120' in order to allow gas to flow around the periphery of the pin 200 and in through one or more ports 204 and to the bore 202.

Preferably also provided in the flow path 86' is a spider 100' to steady the pin 200. As in the previous embodiment, the pin 200 remains stationary as the barrel 50' reciprocates in the nozzle body A'. However in this embodiment gas will flow not only through a passage 86' defined between the pin 200 and the barrel 50' but also through the bore 202 extending through the pin 200. It is believed that under certain circumstances it may be advantageous to provide a flow path through the pin as well as around the pin.

As shown in FIG. 5, the flow path 86' is always open because the inner periphery of bore 62' of the barrel 50' is sufficiently larger than the outer diameter of the pin 200 so as to always leave a gap therebetween whether the barrel is in the retracted position as shown in FIG. 4 or in the extended position. While a fairly large diameter central aperture 202 is illustrated as extending through the pin 200, it should be appreciated that apertures of considerably smaller diameter could also be provided if so desired.

With reference now to FIG. 6, an alternate embodiment of a hollow pin is there illustrated. For ease of comprehension and appreciation of this alternative, like components will be identified by like numerals with a double primed (") suffix and new components will be identified by new numerals.

While in FIG. 5 the aperture 202 is shown as extending longitudinally substantially through the entire pin 200 to the bar aperture 120', it should be appreciated that, as shown in FIG. 6, a considerably shorter aperture 220 can be provided in a pin 200" which aperture extends longitudinally only for a certain limited extent towards a cross bar and then angles out towards the surface of the pin 200". More specifically, in the embodiment illustrated, two ports 222 are shown as extending inwardly from the surface of the pin so as to communicate with the aperture 220. In this type of construction, the gas would merely flow through the gas passage defined between the barrel and the pin until encountering an inlet port 222 to the centrally extending aperture 220 of the pin 200". It is evident that for this type of construction the port 222 is not in line with a gas passage in a cross bar but is located considerably closer to the front end of the pin 200". This type of pin 200" may be advantageous in certain environments.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. An apparatus for injecting a viscous fluid and a non-viscous fluid into a mold cavity of a mold body, the apparatus comprising:

a nozzle body comprising an inlet end and a discharge end, and a flow passage for the viscous fluid extending from said inlet end to said discharge end;

a valve element mounted for reciprocation in said nozzle body flow passage to control a flow of the viscous fluid through said nozzle body discharge end, said valve element comprising:

a barrel having a first end, selectively engaging a portion of the nozzle body discharge end to prevent a flow of the viscous fluid therepast and a second end, and a bore extending longitudinally through said barrel;

a pin located in said barrel bore, said pin having a first end located adjacent said barrel first end and a second end secured to said nozzle body such that said pin remains stationary as said barrel reciprocates in said nozzle body; and, a non-viscous fluid flow passage defined between said pin and said barrel, wherein said barrel bore has a substantially constant diameter at and adjacent said barrel first end.

2. The apparatus of claim 1 further comprising a means for reciprocating said barrel in said nozzle body flow passage.

3. The apparatus of claim 2 wherein said means for reciprocating comprises:

a cross link member to which said barrel is fastened adjacent said second end thereof, wherein said pin extends through an aperture in said cross link member; and, a cylinder mechanism carried by said nozzle body and operatively connected to said cross link member for reciprocating said cross link member and hence said barrel.

4. The apparatus of claim 3 further comprising:

a first non-viscous fluid flow passage extending longitudinally through said pin; and, a second non-viscous fluid flow passage extending in said cross link member and communicating with said first fluid flow passage.

5. The apparatus of claim 3 wherein said pin extends completely through said cross link member and further comprising a seal means fastened to said cross link member and encircling said pin for sealing said pin against said cross link member.

6. The apparatus of claim 1 further comprising a spider located in said barrel bore for supporting said pin.

7. The apparatus of claim 1 further comprising a spider located in said nozzle body flow passage for supporting said barrel.

8. The apparatus of claim 1 wherein said pin front end is substantially flat.

9. The apparatus of claim 1 wherein said pin comprises a right cylinder having a substantially constant diameter.

10. The apparatus of claim 1 further comprising a tip secured to said nozzle body discharge end, said tip having a through bore with a diameter which is larger than the diameter of said barrel bore.

11. An apparatus for injecting a viscous fluid into a mold cavity of a mold body, said apparatus comprising:
- a mold body including a core portion and a cover portion, defining between them a mold cavity;
- a nozzle body positioned adjacent said mold body, said nozzle body comprising an inlet end, a discharge end, which communicates with said mold cavity, and a flow passage for the viscous fluid extending from said inlet end to said discharge end;
- a valve element mounted for reciprocation in said nozzle body flow passage to control a flow of the viscous fluid through said nozzle body discharge end wherein said valve element comprises a barrel having a first end, adapted to selectively engage a portion of said tip section to prevent a flow of the viscous fluid therepast, and a second end, and wherein a bore extends longitudinally in said barrel wherein said valve element further comprises:
  - a cross link bar oriented generally normal to a longitudinal axis of said barrel and secured thereto, and
  - an actuator mechanism operatively connected to said cross link bar;
- a pin which is mounted in said bore such that said pin remains stationary while said barrel reciprocates;
- a seal element encircling said pin and located adjacent said cross link bar for sealing said pin against said cross link bar; and,
- a flow passage defined between said pin and said valve element, said flow passage allowing a flow of a non-viscous fluid through said barrel and into said mold cavity.

12. The apparatus of claim 11 wherein said pin has a flat front end.

13. The apparatus of claim 11 wherein a rear end of said pin is fastened to said nozzle body.

14. The apparatus of claim 11 further comprising a spider located in said barrel bore for stabilizing said pin said barrel bore.

15. A nozzle for injecting a viscous fluid and a non-viscous fluid, comprising:
- a nozzle body having an inlet end, a discharge end and a flow passage for the viscous fluid extending from said inlet end to said discharge end;
- a shut off barrel disposed for reciprocating movement in said nozzle body flow passage to control a flow of the viscous fluid through said nozzle body discharge end;
- a passage extending in said shut off barrel and terminating at a front end thereof;
- a pin mounted on said shut off barrel passage so as to remain stationary when said shut off barrel reciprocates, wherein said pin includes a front end which extends toward said nozzle body discharge end at least as far as a front end of said barrel when said barrel is in a retracted position; and,
- a flow passage defined between said pin and said barrel through which a non-viscous fluid can flow at all positions of said barrel.

16. The nozzle of claim 15 wherein said shut off barrel comprises an elongated body having an enlarged portion.

17. The nozzle of claim 15 wherein said shut off barrel comprises:
- a base section; and,
- a tip section, said tip section being threadedly received on said base section, wherein a first portion of said passage of said barrel extends longitudinally through said tip section and communicates with a second portion of said passage which extends in said base section.

18. The nozzle of claim 15 wherein said pin includes a first end located adjacent a front end of said shut off barrel and a second end, said pin second end being secured to said nozzle body.

19. The nozzle of claim 15 wherein said pin comprises a right cylinder having a substantially constant diameter.

* * * * *